April 28, 1931.  W. LE R. WILLIAMS  1,802,399
LANDING GEAR FOR AEROPLANES
Filed April 14, 1930   2 Sheets-Sheet 1
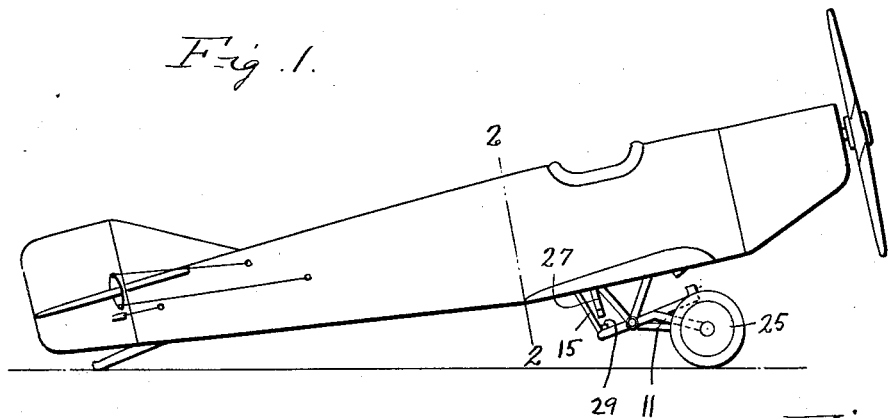
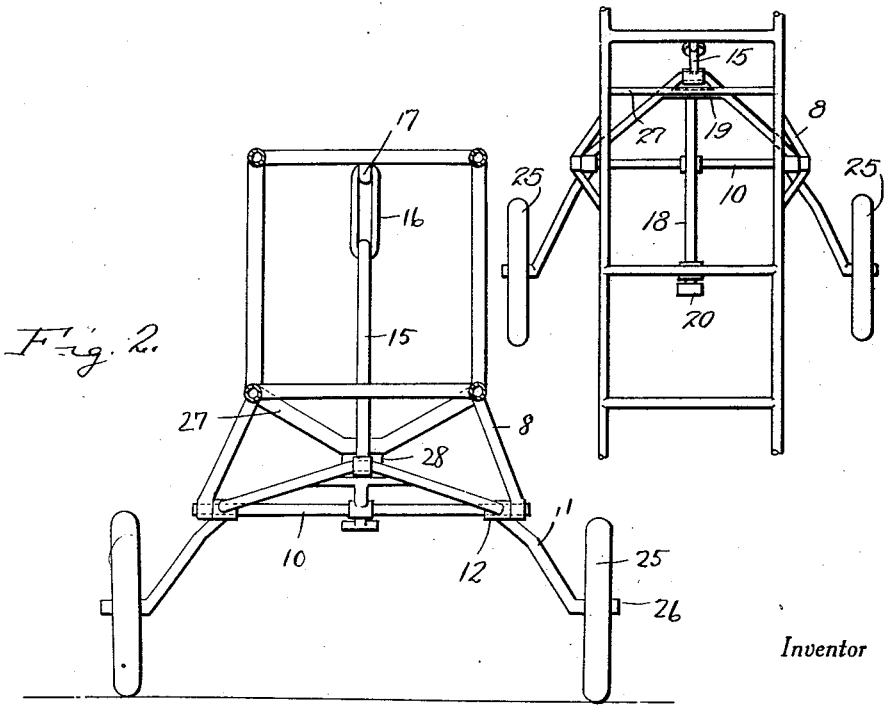
Inventor
William Le Roy Williams
By Clarence A. O'Brien
Attorney April 28, 1931.  W. LE R. WILLIAMS  1,802,399
LANDING GEAR FOR AEROPLANES
Filed April 14, 1930     2 Sheets-Sheet 2
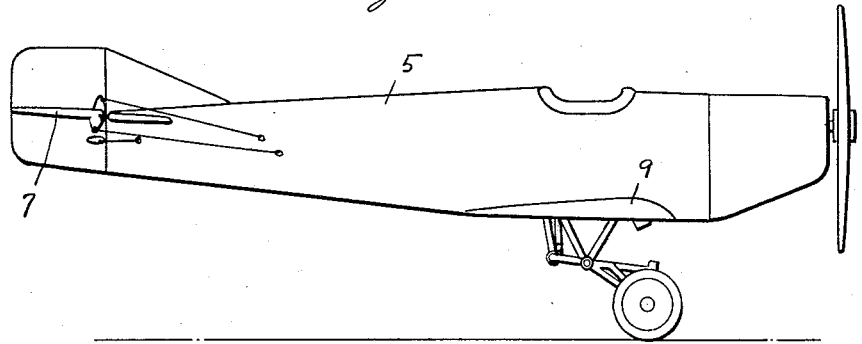
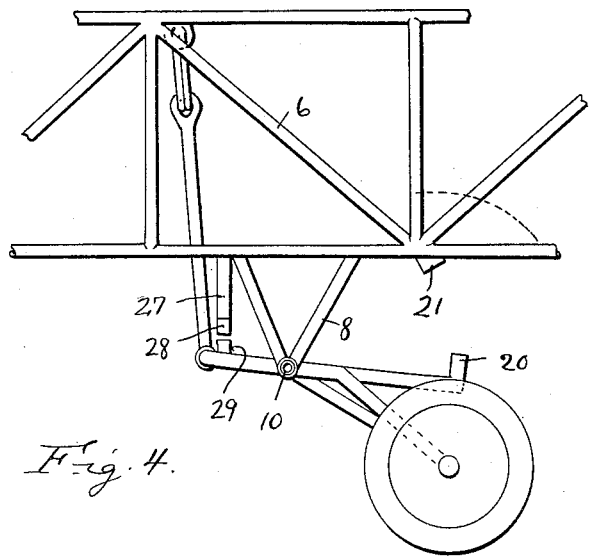
Inventor
William Le Roy Williams
By Clarence A. O'Brien
Attorney Patented Apr. 28, 1931

1,802,399

UNITED STATES PATENT OFFICE

WILLIAM LE ROY WILLIAMS, OF SEMINOLE, OKLAHOMA, ASSIGNOR OF ONE-FOURTH TO W. H. REYNOLDS AND ONE-FOURTH TO CLYDE E. PRATT, OF SEMINOLE, OKLAHOMA

LANDING GEAR FOR AEROPLANES

Application filed April 14, 1930. Serial No. 444,276.

The present invention relates to a landing gear for aircraft and particularly aeroplanes and has for its prime object to provide a structure which insures safety both in landing and in the take off.

Another very important object of the invention resides in the provision of a landing gear of this nature which is simple in construction, inexpensive to manufacture, strong and durable, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of an aeroplane showing my improved landing gear thereon, Figure 2 is a vertical sectional view through the frame work of the fuselage showing the landing gear, said section being taken substantially on the line 2—2 of Figure 1, Figure 3 is another elevation of the aeroplane showing the same about to land or take off, Figure 4 is a fragmentary side elevation of the landing gear showing a portion of the frame work, Figure 5 is a top plan view thereof.

Referring to the drawing in detail it will be seen that the numeral 5 denotes a fuselage which includes the usual frame work 6. At the tail of the fuselage are the usual elevators 7.

Brackets 8 depend from the framework 6 below the wings 9 which project laterally from the fuselage 5 and are of substantially V-shaped formation and support a rod 10 in their lower ends. These brackets 8 diverge downwardly from each other as is indicated to advantage in Figure 2.

A pair of levers 11 are rockably mounted as at 12 intermediate their ends on the end portions of the rod 10 just inside of the lower ends of the brackets 8 and the levers 11 converge rearwardly toward each other and have their rear ends in a portion rockable in a sleeve 14 in the lower end of a connecting rod 15, the upper end of which is engaged with a loop of shock cord 16 suspended from the top of the frame work by suitable element 17.

A bar 18 is provided with a cross head 19 at one end secured to the rear end portions of the levers 11 so as to project forwardly and on the front end is a buffer 20 adapted to strike a buffer 21 carried by the frame work 6.

It will be noted that the rod 10 is located approximately below the center of balance of the aeroplane when in flight. When landing the wheels 25 journalled on lateral axle extensions 26 at the forward ends of the levers 11, move forward thereby bringing the center of balance forward and taking the weight off the front and putting it on the tail, making the tail stay down if landed in soft or rough fields.

When taking off the slip stream blasts the tail off the ground and as the plane gathers speed, it will take the weight off the wheels and move the center of balance back to its flying point making the tail lighter.

The tail surface of the aeroplane is preferably larger than usual to take care of the additional weight it has to lift in getting into flight position.

A bracket 27 depends from the frame 6 and at the lower end thereof said bracket is provided with a bumper 28. A bumper 29 is provided on the cross head 19 of the bar 18, and is adapted to strike the bumper 28 to keep the wheels 25 from swinging back too far when the plane is off the ground.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantages enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an aeroplane, a fuselage including a framework, brackets depending from the framework below the center of balance, a lever structure rockable between the brackets, wheels journalled on the front ends of the lever structure, a rod connected with the rear ends of the lever structure and extending upwardly, elastic means anchoring the upper end of the rod with the framework, a bar incorporated in the lever structure and having a buffer at its front end, and a buffer on the framework with which the first mentioned buffer is adapted to abut.

2. In an aeroplane, a fuselage including a framework, brackets depending from the framework below the center of balance, a lever structure rockable between the brackets, wheels journalled on the front ends of the lever structure, a rod connected with the rear ends of the lever structure and extending upwardly, elastic means anchoring the upper end of the rod with the framework, a bar incorporated in the lever structure and having a buffer at its front end, and a buffer on the framework with which the first mentioned buffer is adapted to abut, a bumper on the rear end of said bar, and a bumper on the framework with which the first mentioned bumper is adapted to abut for limiting the rearward swinging movement of the wheels.

3. In an aeroplane, a fuselage including a framework, a lever structure, means rockably supporting said lever structure from said framework, wheels journaled on one end of the lever structure, elastic means tending to lift the other end of said lever structure for retaining the latter in a predetermined position, front and rear bumpers carried by said frame, front and rear bumpers carried by said lever structure and engageable with the first mentioned bumpers for limiting swinging movement of said lever structure.

In testimony whereof I affix my signature.

WILLIAM LE ROY WILLIAMS.